United States Patent
Heimberger et al.

(10) Patent No.: US 11,383,738 B2
(45) Date of Patent: Jul. 12, 2022

(54) METHOD FOR OPERATING A DRIVING ASSISTANCE SYSTEM OF A MOTOR VEHICLE WITH REMOTE-CONTROLLED MANOEUVRING OF THE MOTOR VEHICLE AT DIFFERENT AUTOMATION LEVELS AND DRIVING ASSISTANCE SYSTEM

(71) Applicant: Valeo Schalter und Sensoren GmbH, Bietigheim-Bissingen (DE)

(72) Inventors: Markus Heimberger, Bietigheim-Bissingen (DE); Dimitrios Tzempetzis, Bietigheim-Bissingen (DE); Stefanie Prinzhausen, Bietigheim-Bissingen (DE)

(73) Assignee: Valeo Schalter und Sensoren GmbH, Bietigheim-Bissingen (DE)

( * ) Notice: Subject to any disclaimer, the term of this patent is extended or adjusted under 35 U.S.C. 154(b) by 0 days.

(21) Appl. No.: 16/967,943

(22) PCT Filed: Feb. 5, 2019

(86) PCT No.: PCT/EP2019/052683
§ 371 (c)(1),
(2) Date: Aug. 6, 2020

(87) PCT Pub. No.: WO2019/154766
PCT Pub. Date: Aug. 15, 2019

(65) Prior Publication Data
US 2021/0253134 A1 Aug. 19, 2021

(30) Foreign Application Priority Data
Feb. 8, 2018 (DE) ...................... 10 2018 102 795.8

(51) Int. Cl.
*B60W 60/00* (2020.01)
*B60W 50/10* (2012.01)
*G06V 20/56* (2022.01)

(52) U.S. Cl.
CPC ........ *B60W 60/0059* (2020.02); *B60W 50/10* (2013.01); *B60W 60/001* (2020.02); *B60W 60/0053* (2020.02); *G06V 20/56* (2022.01)

(58) Field of Classification Search
None
See application file for complete search history.

(56) References Cited

U.S. PATENT DOCUMENTS 10,268,191 B1 * 4/2019 Lockwood ........... G05D 1/0027
2016/0116293 A1 * 4/2016 Grover ................ G01C 21/34
701/23

(Continued)

FOREIGN PATENT DOCUMENTS

DE 102008051982 A1 6/2009
DE 102013213225 A1 1/2015

(Continued)

OTHER PUBLICATIONS

Espacenet translation of DE102014018192A1, Jun. 2015, Christophe Bonnet (Year: 2015).*

(Continued)

*Primary Examiner* — James J Lee
*Assistant Examiner* — Andrew Sang Kim
(74) *Attorney, Agent, or Firm* — Osha Bergman Watanabe & Burton LLP (57) ABSTRACT

A method for operating a driving assistance system of a motor vehicle includes manoeuvring the motor vehicle autonomously with a driving assistance system while a user with a mobile terminal is located outside the motor vehicle. The user performs, by the driving assistance system and (Continued)

during the manoeuvring, longitudinal guidance and transverse guidance of the motor vehicle. The driving assistance system is operated at a first automation level when communication between the driving assistance system and the mobile terminal is ensured. While the user activates the mobile terminal, the longitudinal guidance, and the transverse guidance in a predetermined fashion, a surrounding area of the motor vehicle is sensed, at the first automation level, by the driving assistance system, and in addition to the longitudinal guidance and the transverse guidance of the motor vehicle. The motor vehicle is then autonomously manoeuvred according to the sensed surrounding area.

14 Claims, 4 Drawing Sheets

(56) References Cited

U.S. PATENT DOCUMENTS

| | | | | |
|---|---|---|---|---|
| 2016/0264132 | A1* | 9/2016 | Paul | G05D 1/0016 |
| 2017/0253237 | A1* | 9/2017 | Diessner | B60W 30/06 |
| 2017/0308092 | A1* | 10/2017 | Altinger | B60W 30/06 |
| 2019/0077458 | A1* | 3/2019 | Khlifi | B62D 15/0265 |

FOREIGN PATENT DOCUMENTS

| | | |
|---|---|---|
| DE | 102013217071 A1 | 3/2015 |
| DE | 102014018192 A1 | 6/2015 |
| DE | 102014215096 A1 | 2/2016 |
| DE | 102014216577 A1 | 2/2016 |
| DE | 102014015655 A1 | 4/2016 |
| DE | 102015208624 A1 | 11/2016 |
| DE | 102017012196 A1 | 7/2018 |

OTHER PUBLICATIONS

Espacenet translation of DE102016214433A1, Feb. 2018, Jbrn Michaelis (Year: 2018).*
Espacenet translation of DE102017012196A1, Jul. 2018, Thorben Gnzel (Year: 2018).*
International Search Report and Written Opinion in corresponding International Application No. PCT/EP2019/052683, dated May 14, 2019 (13 pages).
German Search Report in corresponding German Application No. 10 2018 102 795.8, dated Oct. 9, 2018 (7 pages).

* cited by examiner

METHOD FOR OPERATING A DRIVING ASSISTANCE SYSTEM OF A MOTOR VEHICLE WITH REMOTE-CONTROLLED MANOEUVRING OF THE MOTOR VEHICLE AT DIFFERENT AUTOMATION LEVELS AND DRIVING ASSISTANCE SYSTEM

TECHNICAL FIELD

The present invention relates to a method for operating a driving assistance system of a motor vehicle, in which the motor vehicle is manoeuvred autonomously by means of the driving assistance system while a user with a mobile terminal is located outside the motor vehicle. There is provision here that during the manoeuvring longitudinal guidance and transverse guidance of the motor vehicle are carried out by means of the driving assistance system. Furthermore, the present invention relates to a driving assistance system for a motor vehicle.

BACKGROUND

The focus here is on driving assistance systems for motor vehicles which serve to assist a driver when driving a motor vehicle. Such driving assistance systems can have, for example, a plurality of sensors with which the surroundings or a surrounding area of the motor vehicle can be sensed. In this way, objects and obstacles in the surrounding area of the motor vehicle can be detected. Furthermore, driving assistance systems are known which can determine, in accordance with the detected objects, a trajectory along which the motor vehicle is then manoeuvred at least semi-autonomously using the driving assistance system. Such driving assistance systems are used, for example, to assist a driver when parking in a parking space and/or exiting a parking space.

Furthermore, the prior art has disclosed driving assistance systems which can determine a corresponding avoidance trajectory when they are manoeuvring the motor vehicle along a previously planned trajectory. This is necessary, for example, if an object which is present in the vicinity of the trajectory is detected during the manoeuvring. In this respect, DE 10 2014 018 192 A1 describes a method for controlling a vehicle in which a trajectory which is determined from current driving data of the vehicle is compared with a setpoint trajectory when a surrounding area changes. In this context, deviations between the new trajectory and the setpoint trajectory are determined, and a new setpoint trajectory is set in accordance with the deviations. There may be provision here that the new setpoint trajectory is activated by the driver or user of the vehicle.

In addition, methods in which the motor vehicle is controlled with a corresponding remote control system or with a mobile terminal during the autonomous manoeuvring are known from the prior art. In this context, DE 10 2013 217 071 A1 describes a method for reversing an automatic parking process of the motor vehicle. In this context, at least part of an automatic parking process is carried out and the manoeuvre which is carried out by the motor vehicle is stored. In addition there is provision that reverse execution of the at least one part of the stored manoeuvre is carried out in order to follow in a reversed sequence the parking trajectory which is travelled along during the parking process. It is proposed here that the reverse execution can be actuated in a remote-controlled fashion, for example by means of mobile phone, a key of the motor vehicle or touch sensitive areas on the motor vehicle.

Moreover, driving assistance systems are known in which a trajectory can be recorded in a training phase. In a subsequent operational phase of the driving assistance system, the motor vehicle can then be manoeuvred by means of the driving assistance system autonomously along the previously stored or trained trajectory. Such a method is described, for example, in DE 10 2013 213 225 A1. There is provision here that a stored trajectory is retrieved and the trajectory from a starting position to a target position of the vehicle and surrounding objects are displayed to the driver using a display device. In addition there is provision that at least one obstacle which is not installed with the trajectory and which is located in front of the vehicle, between the starting position and the target position, is displayed to the driver, wherein by making an input using an HMI element the driver informs the parking assistance system how the vehicle is to drive around the obstacle. In this context they can also be provision that the inputting of the directional instruction for driving around the object is made on a smartphone or a tablet PC.

In the methods in which the motor vehicle is manoeuvred by means of the driving assistance system and the user or driver is located outside the motor vehicle, full control is with the user. This ensures that the user uses the mobile terminal or a dead man's switch and therefore interacts continuously with the motor vehicle. As soon as the user detects a hazard, he releases the dead man's switch and the motor vehicle is braked automatically.

SUMMARY

An object of the present invention is to disclose a solution with which a method for operating a driving assistance system in which the user is located outside the motor vehicle can be expanded in such a way that the user is supported more reliably by the driving assistance system.

This object is achieved according to the invention by a method and by a driving assistance system having the features according to the respective independent claims. Advantageous developments of the present invention are the subject matter of the dependent claims.

According to one embodiment of a method for operating a driving assistance system of a motor vehicle, the motor vehicle is preferably manoeuvred autonomously by means of the driving assistance system while a user with a mobile terminal is located outside the motor vehicle. In this context, during the manoeuvring, in particular longitudinal guidance and transverse guidance of the motor vehicle are carried out by means of the driving assistance system. There is in particular provision here that during the manoeuvring the driving assistance system is operated at a first automatic safety level if communication between the driving assistance system and the mobile terminal is preferably ensured. At the first automation level, in addition to the longitudinal guidance and transverse guidance of the motor vehicle a surrounding area of the motor vehicle is preferably sensed by means of the driving assistance system and the motor vehicle is manoeuvred autonomously, in particular, in accordance with the sensed surrounding area.

A method according to the invention serves to operate a driving assistance system of a motor vehicle in which the motor vehicle is manoeuvred autonomously by means of the driving assistance system while a user with a mobile terminal is located outside the motor vehicle. In this context, during the manoeuvring, longitudinal guidance and transverse guidance of the motor vehicle are carried out by means of the driving assistance system. Furthermore, there is provision that during the manoeuvring the driving assistance system is operated at a first automation level if communication between the driving assistance system and the mobile terminal is ensured, wherein at the first automation level, in addition to the longitudinal guidance and transverse guidance of the motor vehicle, a surrounding area of the motor vehicle is sensed by means of the driving assistance system, and the motor vehicle is manoeuvred in accordance with the sensed surrounding area.

The intention is that using the method the motor vehicle will be manoeuvred autonomously while a driver or the user is located outside the motor vehicle. For example, the motor vehicle can be parked autonomously in a parking space or can be made to exit a parking space autonomously. There can also be provision that the motor vehicle will be manoeuvred autonomously along a previously recorded trajectory. During the autonomous manoeuvring of the motor vehicle, the user activates the mobile terminal which is located outside the motor vehicle. For example, the user can hold the mobile terminal in his hand. The mobile terminal can be, for example, a mobile phone, a smartphone, a tablet PC, a portable computer, a vehicle key, data glasses or the like. Using the mobile terminal a control signal can be transmitted to the driving assistance system or to a communication device of the driving assistance system. For this purpose, a radio link can be established between the mobile terminal and the communication device of the driving assistance system. The control signal is therefore preferably transmitted in a cableless or wireless fashion from the mobile terminal to the communication device.

As soon as a control signal has been received by the communication device of the driving assistance system, said signal can be transmitted to an electronic control unit of the driving assistance system. Using the control unit it is then possible to activate the driving assistance system and the motor vehicle can in this way be manoeuvred autonomously. In this context there is provision that during the autonomous manoeuvring the motor vehicle performs both the longitudinal guidance and the transverse guidance of the motor vehicle. This means that the driving assistance system engages in a steering system, in a brake system and in a drive motor or engine of the motor vehicle.

According to one essential aspect of the present invention there is provision that during the manoeuvring the driving assistance system is operated at the first automation level if the communication between the driving assistance system and the mobile terminal is ensured. At this first automation level, the driving assistance system can additionally sense the surroundings of the motor vehicle and manoeuvre the motor vehicle autonomously in accordance with the sensed surroundings. For example, the driving assistance system can have corresponding surroundings sensors with which objects in the surroundings or a surrounding area of the motor vehicle can be sensed. In this way, the driving assistance system which controls the motor vehicle while the user is located outside the motor vehicle performs, in addition to known methods, the monitoring of the driving environment. In known methods, the driving-mode-specific execution of steering, acceleration and/or braking processes by the driving assistance system is carried out by the driving assistance system using information about the surroundings and with the expectation that the human user executes all the remaining aspects of the dynamic driving task. In this context, the driving assistance system controls the motor vehicle autonomously, but the monitoring of the driving environment continues to be assigned to the person or the user. It corresponds to what is referred to as partial automation, which is assigned, for example in the context of driving assistance systems in which the user is located inside the motor vehicle, to the SAE Level 2. According to the present invention there is provision that a higher automation level is used for the operation of the driving assistance system in which the driver is located outside the motor vehicle. This first automation level can also be referred to as conditional automation which, for driving assistance systems in which the user is located inside the motor vehicle, is defined according to the SAE Level 3. In this context there is provision that the driving-mode-specific execution of an automated driving system is carried out for all aspects of the dynamic driving task with the expectation that the human user will react appropriately to a request by the system. The above-mentioned levels are defined, for example, in the Standard SAE J3016, which describes the classification and definition of terms for road motor vehicles with systems for autonomous driving.

According to the invention there is provision that this first automation level is selected if the communication between the driving assistance system and the mobile terminal, which the user holds outside the motor vehicle, is ensured. If this communication is insured, it can be guaranteed that the user can engage in the autonomously executed driving manoeuvre, if appropriate while taking into account the corresponding reaction time. This means that the user can still engage but does not have to to be continuously in the action. Therefore, the driving assistance system is given more responsibility. As result, the user can be more reliably supported by the driving assistance system if the user is located outside the motor vehicle.

At the first automation level a request signal is preferably transmitted by the driving assistance system to the mobile terminal if it is necessary for the user to intervene in the autonomous driving manoeuvre. At the first automation level, the surrounding area or the environment of the motor vehicle can be monitored with the driving assistance system. For example, different static objects such as curbstones, walls or the like can be detected. It is also possible to detect dynamic objects such as pedestrians, children or the like. In particular, the intention is that the driving assistance system will be used to check whether an object is located within the driving tube of the motor vehicle. In this context, the driving tube describes the area which the motor vehicle will take up during future travel. In this context there is provision that the driving assistance system can detect the objects so early that the motor vehicle can be stopped by means of the driving assistance system, so that there is no risk of a collision between the motor vehicle and the object. If the driving assistance system detects a situation which requires the user to intervene, said system can transmit the request signal to the mobile terminal. Using the mobile terminal, a corresponding message or warning can then be output to the user. This warning can be output acoustically, optically and/or haptically by means of the mobile terminal. In order to be able to ensure the transmission of this request signal, it is necessary for the communication link between the driving assistance system and the mobile terminal to be present. Only in this case is the driving assistance system operated at the first automation level. Otherwise, there may be provision, for example, that the motor vehicle is placed in a safe state.

In a further embodiment, if a predetermined hazardous situation is detected, the request signal is transmitted by the driving assistance system to the mobile terminal, and information about the hazardous situation is output by means of the mobile terminal after the reception of the request signal.

This predetermined hazardous situation can describe, for example, that an object is located in the driving tube of the motor vehicle or that a dynamic object has been detected. If this predetermined hazardous situation is detected by means of the driving assistance system, the request signal can be transmitted to the mobile terminal. An output can then be made to the user by means of the mobile terminal in accordance with the hazardous situation. This output can contain information about the hazardous situation. This output can describe, for example, that an object is located in the surrounding area of the motor vehicle and that interaction by the user is required. This can prevent a collision between the motor vehicle and the object occurring in the hazardous situation.

Furthermore, it is advantageous if the driving assistance system is operated at a second automation level when manoeuvring if the predetermined hazardous situation is recognized, wherein the driving assistance system carries out the longitudinal guidance and the lateral guidance at the second automation level, as long as the user actuates the mobile terminal device in a predetermined manner. If the hazardous situation is detected, it is possible to switch back from the first automation level to the second automation level. The second automation level corresponds to the case in which the driving assistance system carries out the steering processes, acceleration processes and braking processes, but the monitoring of the driving environment is assigned to the user. As already explained, this can be assigned to the SAE Level 2. If the hazardous situation is detected, the motor vehicle is manoeuvred autonomously by the driving assistance system as long as the user also activates the mobile terminal or the dead man's switch. In this context, the mobile terminal is actuated in the predetermined manner. This can include, for example, the fact that the user keeps a switch or an operator control panel of the mobile terminal pressed or continuously makes a corresponding operator control input. This permits safe operation of the driving assistance system if the user is located outside the motor vehicle and a hazardous situation is detected.

In a further embodiment, the driving assistance system is placed in a safe state in which the motor vehicle is braked, in particular to a standstill, in accordance with the detected hazardous situation before the operation at the second automation level. If the predetermined hazardous situation is detected by means of the driving assistance system, the motor vehicle can be placed in the safe state. In this context, the motor vehicle can be braked to a standstill. In addition, the request signal can be transmitted to the user by means of the driving assistance system. If the user is correspondingly informed about the hazardous situation by means of the mobile terminal after the reception of the request signal, the autonomous travel can be continued at the second automation level. In this context, the user can activate the mobile terminal in the predetermined manner. This can ensure the necessary safety when manoeuvring the motor vehicle.

Furthermore, it is advantageous if the driving assistance system is operated again at the first automation level after the detection of the hazardous situation, if the user makes a predetermined operator control input. As already explained, after the detection of the hazardous situation the user can be correspondingly informed, and the motor vehicle can be placed in a safe state. Subsequent to this, the user can assess whether the hazardous situation is present. If the hazardous situation has been incorrectly detected or the hazardous situation is no longer present, the user can make a corresponding operator control input on the mobile terminal. Subsequent to this, the driving assistance system can be operated at the first automation level again. This is the case, for example, if a movable object has been detected as the predetermined hazardous situation, and this movable object has moved out of the driving tube or the surrounding area again. If the user detects that the hazardous situation is not present, or is no longer present, said user can make the predetermined operator control input, as a result of which the driving assistance system is set to the first automation level again. This permits interaction by the user in a possible hazardous situation.

It not only possible that the hazardous situation resolves itself, as it were, but also it is also the case that the situation can be avoided. If the hazardous situation is detected in the form of an object in the driving tube, the driving assistance system can be operated at the second automation level. In this context, an avoidance trajectory can be planned by means of the driving assistance system in order to avoid the object. In addition, the motor vehicle can be manoeuvred along the avoidance trajectory by means of the driving assistance system. As soon as the object has been avoided and the motor vehicle is located back on the path again or is on the planned trajectory again, there can be a change-over from the second automation level into the first automation level. The motor vehicle can therefore be safely manoeuvred by means of the driving assistance system when an object is present in the driving tube.

In this context, there is, in particular, provision that an object in the surrounding area of the motor vehicle, a failure of a sensor for monitoring the surrounding area and/or a predetermined deviation when the motor vehicle is localised is identified as the hazardous situation. As already explained, an object which is located inside the driving tube can be detected as the predetermined hazardous situation. The predetermined hazardous situation can also be assumed to be present if a moving or dynamic object is detected in the surrounding area of the motor vehicle. The predetermined hazardous situation can also be assumed to be present if it is detected that a sensor of the driving assistance system, which is used to monitor the surrounding area or the environment, is not functionally capable. In this case it cannot be ensured that the driving assistance system is reliably operated at the first automation level. During the autonomous manoeuvering of the motor vehicle, the motor vehicle is localised continuously. This localisation process can be carried out, for example, by means of odometry. Simultaneous localisation and mapping (SLAM) can also be used for the localisation process. In this context, the surrounding area can be sensed with the sensors, and a digital map of the surrounding area can be produced by means of the driving assistance system. The position and/or orientation of the motor vehicle within the map can then be estimated by means of the driving assistance system. There can, for example, also be provision that the localisation is carried out by means of a satellite-based position-determining system. If the localisation is currently not possible or a predetermined deviation is detected, a hazardous situation can also be assumed to be present. As already explained, after the detection of the hazardous situation corresponding information describing this hazardous situation can be output to the user.

In a further refinement, if an avoidance trajectory outside a predetermined driveable area is planned by means of the driving assistance system, the avoidance trajectory is displayed to the user. A predetermined driveable area can be defined for the operation of the driving assistance system or for the execution of the autonomous driving manoeuvre. This driveable area describes the area in which the motor vehicle can be moved during the autonomous driving manoeuvre. This driveable area can be assigned, for example, to a roadway or the like. If an object is detected in the driving tube by means of the driving assistance system, an avoidance trajectory which deviates from an originally planned trajectory can be determined with the driving assistance system. If the avoidance trajectory extends at least partially outside the driveable area, corresponding information can be output to the user and the avoidance trajectory can be displayed to him. This is the case, for example, if the avoidance trajectory extends at least partially outside the roadway or a metalled underlying surface. For example, the avoidance trajectory could extend over a grass verge. In this context, the avoidance trajectory can be visually displayed to the user on the mobile terminal. As an alternative to this, the avoidance trajectory can be projected onto the roadway surface by means of the headlights or some other projection device of the motor vehicle. In this way, the user can reliably assess whether the motor vehicle can be manoeuvred along the avoidance trajectory.

In this context there is provision, in particular, that after the execution of an operator control input by the user on the mobile terminal the motor vehicle is manoeuvred along the planned avoidance trajectory by means of the driving assistance system. As already explained, the avoidance trajectory which is planned by the driving assistance system is displayed to the user if it extends outside this driveable area. On the basis of this information the user can then decide whether the motor vehicle can be manoeuvred along this avoidance trajectory or whether there is risk of damage to the motor vehicle or some other object during the manoeuvring along the avoidance trajectory. If the user realises that the motor vehicle can be manoeuvred along the avoidance trajectory, he can make the predetermined operator control input on the mobile terminal, and the motor vehicle can then be manoeuvred along the avoidance trajectory.

There can also be provision that the driving assistance system can plan an avoidance trajectory, and the motor vehicle manoeuvres along the avoidance trajectory if the avoidance trajectory is located completely within the driveable area. There can also be provision that the driving assistance system decides whether the planning of an avoidance trajectory or an avoidance manoeuvre can be avoided. If this is the case, corresponding information can be transmitted to the mobile terminal or to the user. An example of this would be if a mobile object is detected in the driving tube by means of the driving assistance system. The mobile object can be, for example, a parked bicycle or a dustbin. In this case, it is possible to output to the user information which requests him to remove the mobile object. In this context, the driving assistance system can firstly transfer the motor vehicle into the safe state. If it is detected that the mobile object has been removed, the vehicle can continue to travel again at the first automation level.

In a further embodiment, the motor vehicle is moved along a previously recorded trajectory at the first automation level. For example, the driving assistance system can be used to manoeuvre the motor vehicle autonomously within a home zone. There can be provision here that during a training phase the motor vehicle is firstly manoeuvred manually along the trajectory by the user. This trajectory is stored together with objects which have been sensed during the training phase. In a subsequent operating phase of the driving assistance system, the motor vehicle can then be manoeuvred along the previously stored trajectory. This is suitable, for example, if the motor vehicle is manoeuvred along a piece of land to a garage.

In a further refinement, in order to determine whether the communication between the driving assistance system and the mobile terminal is ensured, it is checked whether the mobile terminal is in a communication area and/or whether a communication link has been established between the driving assistance system and the mobile terminal. A wireless data link can be provided between the mobile terminal and the driving assistance system or the communication device of the driving assistance system. In order to be able to ensure that the communication link is present, corresponding data or signals can be exchanged between the mobile terminal and the driving assistance system. Alternatively or additionally it is possible to check whether the user who is carrying the mobile terminal is located in a communication area around the motor vehicle. This communication area can be determined in accordance with the type of data communication. In particular, the communication area can be defined in such a way that the data communication is usually ensured if the mobile terminal is located within the communication area. This communication area can additionally be protected with an ASIL-B security mechanism in order to ensure secure communication.

In a further embodiment, an autonomy area is determined in which the motor vehicle is manoeuvred at the first automation level, wherein the autonomy area lies within the communication area. There is, in particular, provision that the motor vehicle is operated only at the first automation level if the mobile terminal or the user is also located in the autonomy area. In this way, it can be reliably guaranteed that the communication between the mobile terminal and the driving assistance system is ensured.

In a further embodiment, an intermediate area between the autonomy area and the communication area is determined and a message signal is transmitted to the mobile terminal if the user is located in the intermediate area, wherein the message signal instructs the user to move back into the autonomy area. If the user moves from the autonomy area into the intermediate area, there is a risk of the user moving outside the communication area, and therefore a risk that the communication between the mobile terminal and the driving assistance system will no longer be able to be ensured. In this case, the message signal which requests the user to move back into the autonomy area is output to said user. The message signal can also contain information about the spatial position of the autonomy area.

Furthermore, it is advantageous if the driving assistance system is placed into a safe state in which the motor vehicle is braked to a stationary state if the communication between the driving assistance system and the mobile terminal is not ensured. If the driving assistance system or the communication device of the driving assistance system cannot localise the user or else the user is located outside the communication area or the autonomy area, the motor vehicle can be placed in a safe state. There is provision in particular that the motor vehicle is braked to a standstill in order to place it in the safe state. The braking of the motor vehicle can be carried out in a predetermined fashion or with a predetermined deceleration.

A driving assistance system according to the invention is designed to carry out a method according to the invention and to implement the advantageous embodiments thereof. The driving assistance system, which can also be referred to as a driver assistance system, can comprise an electronic control unit. In addition, the driving assistance system can comprise a multiplicity of surroundings sensors with which the surrounding area of the motor vehicle can be monitored and objects can be detected in the surrounding area.

A motor vehicle according to the invention comprises a driving assistance system according to the invention. The motor vehicle is embodied in particular as a passenger motor vehicle. There can also be provision that the motor vehicle is embodied as a utility vehicle.

The invention also includes a computer program with program code means which are stored in a computer-readable medium in order to carry out the method according to the invention and the advantageous embodiments when the computer program product is run on a processor of an electronic control unit.

A further aspect of the invention relates to a computer-readable medium, in particular in the form of a computer-readable diskette, CD, DVD, memory card, USB storage unit or the like in which program code means are stored in order to carry out the method according to the invention and the advantageous embodiments thereof when the program code means is loaded into a memory of an electronic control unit and run on a processor of the electronic control unit.

The preferred embodiments which are presented with respect to the method according to the invention, and the advantages thereof, apply correspondingly to the driving assistance system according to the invention, to the motor vehicle according to the invention, to the computer program product according to the invention and to the computer-readable medium according to the invention.

Further features of the invention emerge from the claims, the figures and the description of the figures. The features and combinations of features that are cited in the description above and also the features and combinations of features that are cited in the description of the figures below and/or shown in the figures alone can be used not only in the respectively indicated combination but also in other combinations without departing from the scope of the invention. Embodiments of the invention that are not explicitly shown and explained in the figures, but emerge and are producible from the explained embodiments by virtue of separate combinations of features, are therefore also intended to be regarded as included and as disclosed. Embodiments and combinations of features that therefore do not have all the features of an independent claim as originally worded are also intended to be regarded as disclosed. Furthermore, embodiments and combinations of features that go beyond or differ from the combinations of features set out in the back-references of the claims should be considered to be disclosed, in particular by the embodiments set out above.

The invention will now be explained in more detail on the basis of preferred exemplary embodiments and with reference to the attached drawings.

BRIEF DESCRIPTION OF DRAWINGS

In the figures.

In the figures, identical or functionally identical elements are provided with the same reference signs.

DETAILED DESCRIPTION

Figure 1:
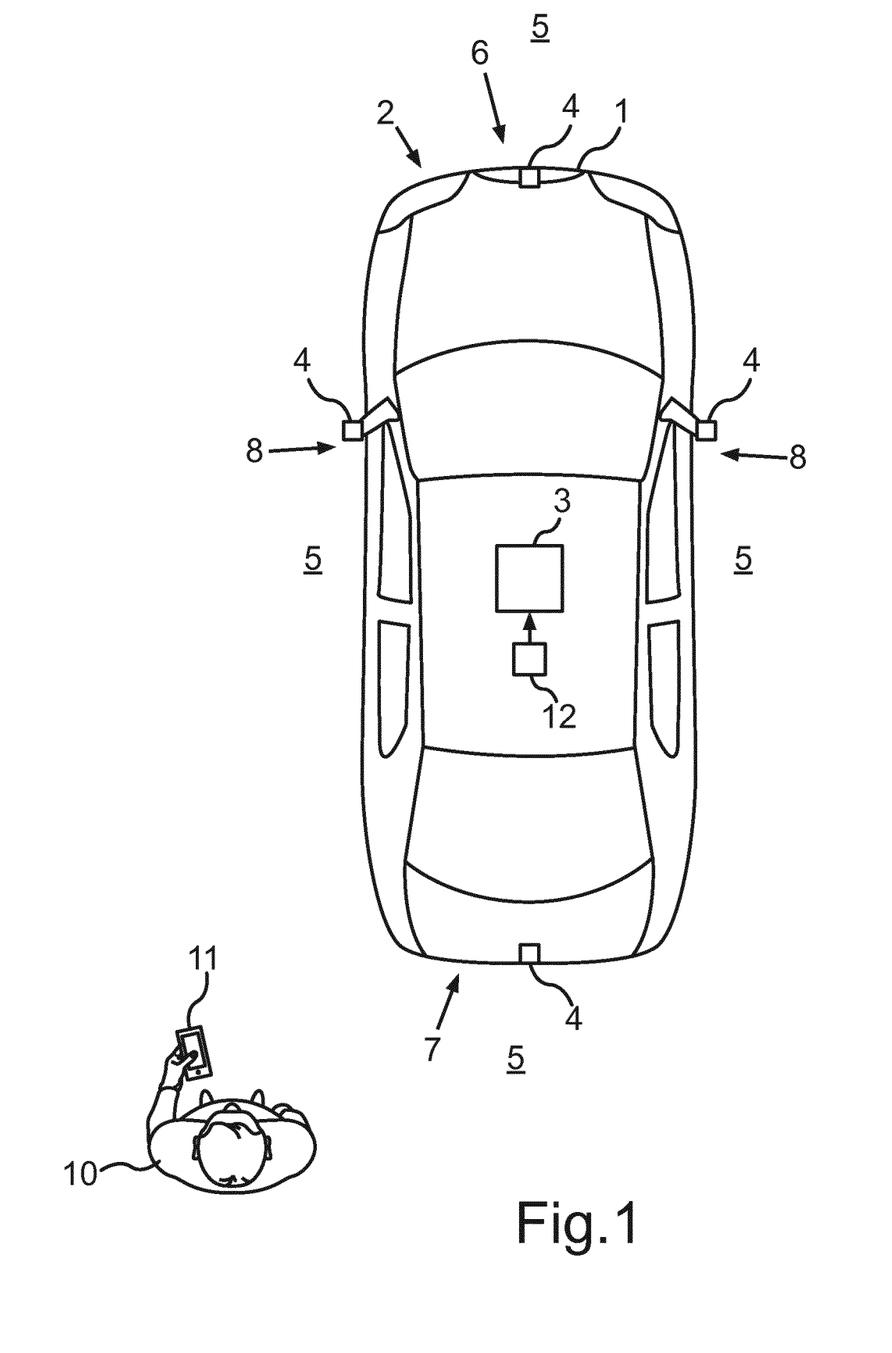
FIG. 1 shows a motor vehicle which comprises a driving assistance system, and a user who is located outside the motor vehicle and holds a mobile terminal.

FIG. 1 shows a motor vehicle 1, embodied here as a passenger car, in a plan view. The motor vehicle 1 comprises a driving assistance system 2 according to an embodiment of the present invention. The driving assistance system 2 comprises at least one sensor 4 by means of which a surrounding area 5 of the motor vehicle 1 can be sensed. In the present exemplary embodiment, the driving assistance system 2 comprises four sensors 4, one of which is arranged in a front area 6, one in a rear area 7 and two in respective side areas 8, in particular in the vicinity of the wing mirrors. The sensors 4 can be, for example, ultrasonic sensors, cameras, radar sensors, lidar sensors, laser scanners or the like. Sensor signals which describe the surrounding area 5 of the motor vehicle 1 and objects 9 in the surrounding area 5 can be provided by means of the sensors.

Furthermore, the driving assistance system 2 comprises an electronic control unit 3 which is connected to the sensors 4 in order to transmit data. Corresponding data lines are not illustrated here for the sake of clarity. In this way, the sensor signals which are determined with the sensors 4 can be transmitted to the control unit 3. On the basis of the sensor signals it is possible to check, by means of the control unit 3, whether the object 9 is located in the surrounding area 5 and at what position the object 9 is located. A user 10 who is holding a mobile terminal 11 is located in the surrounding area 5 of the motor vehicle 1. The mobile terminal 11 is here a smartphone or a mobile phone. The driving assistance system 2 of the motor vehicle 1 also comprises a communication device 12 by means of which a wireless data link to the mobile terminal 11 can be set up. In this way, the mobile terminal 11 is connected to the driving assistance system 2 for the transmission of data.

The motor vehicle 1 can be manoeuvred autonomously using the driving assistance system 2 if the user 10 is located outside the motor vehicle 1. In this context, the driving assistance system 2 can be operated at a second automation level. At this second automation level, the driving assistance system 2 performs both the longitudinal guidance and the transverse guidance of the motor vehicle 1. In this context, the motor vehicle 1 is manoeuvred autonomously by means of the driving assistance system 2 as long as the user 10 makes a predetermined operator control input on the mobile terminal 11. As soon as the user 10 no longer makes the predetermined operator control input, the motor vehicle 1 is placed in a safe state by means of the driving assistance system 2 and braked, for example, to a stationary state. The second automation level can correspond to partial automation according to the SAE Level 2. In this context, the motor vehicle 1 is manoeuvred autonomously by means of the driving assistance system 2, but the monitoring of the surrounding area 5 is assigned to the user 10. In this case, the user 10 has full control. This is ensured by virtue of the fact that the user 10 continually activates the mobile terminal 11 during the autonomous manoeuvering and therefore interacts continuously with the driving assistance system 2. As soon as the user 10 themselves detects a hazardous situation, he can stop making the control input on the mobile terminal 11, and the motor vehicle 1 is placed in the safe state or braked.

There is provision here that the driving assistance system 2 is also operated at a first automation level. The first automation level can correspond to limited automation according to the SAE Level 3. In this case, the surrounding area 5 can be sensed using the sensors 4 of the driving assistance system 2, and the driving assistance system 2 can manoeuvre the motor vehicle autonomously in accordance with the sensed surrounding area 5. If an interaction with the user 10 is required, a corresponding request signal can be transmitted to the mobile terminal 11 by means of the driving assistance system 2 or the communication device 12. In this way it can be ensured that the user 10 can still intervene but does not need to constantly interact with the driving assistance system.

Figure 2:
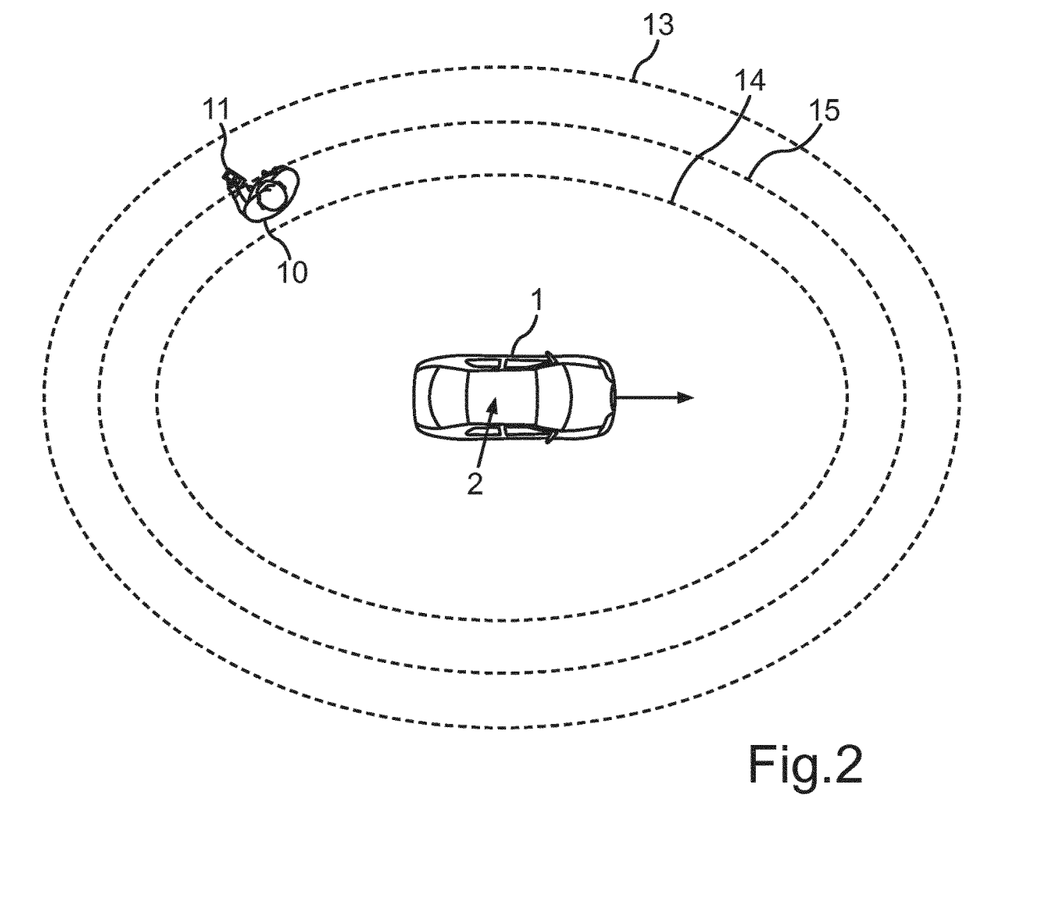
FIG. 2 shows the motor vehicle and the user according to FIG. 1, wherein different areas are defined in a surrounding area of the motor vehicle.

There is provision here that the driving assistance system 2 is operated at the first automation level if the user 10 is located within a communication area 13. This communication area 13 describes an area in which the transmission of data can be ensured between the driving assistance system 2 and the mobile terminal 11. The communication area 13 can be defined, for example, on the basis of the communication link used. An autonomy area 14 in which the motor vehicle 1 can be manoeuvred autonomously by means of the driving assistance system 2 is defined within the communication area 13. There may be provision here that the driving assistance system 2 is operated at the first automation level only if the user 10 is located within the autonomy area 14 or at least within the communication area 13. If the driving assistance system 2 can no longer localise the mobile terminal 11 or if the user 10 is located outside the communication area 13, the motor vehicle 1 can be placed in the safe state. An intermediate area 15 is defined here between the communication area 13 and the autonomy area 14. If the user 10 is, as shown in the present example, located in the intermediate area 15, a message signal is transmitted to the mobile terminal 11 or the user 10 by means of the driving assistance system 2. A request can be output to the user 10 in accordance with the message signal that the user should move into the autonomy area 14 again. In this way, the communication between the mobile terminal 11 and the driving assistance system 2 can be ensured.

Figure 3:
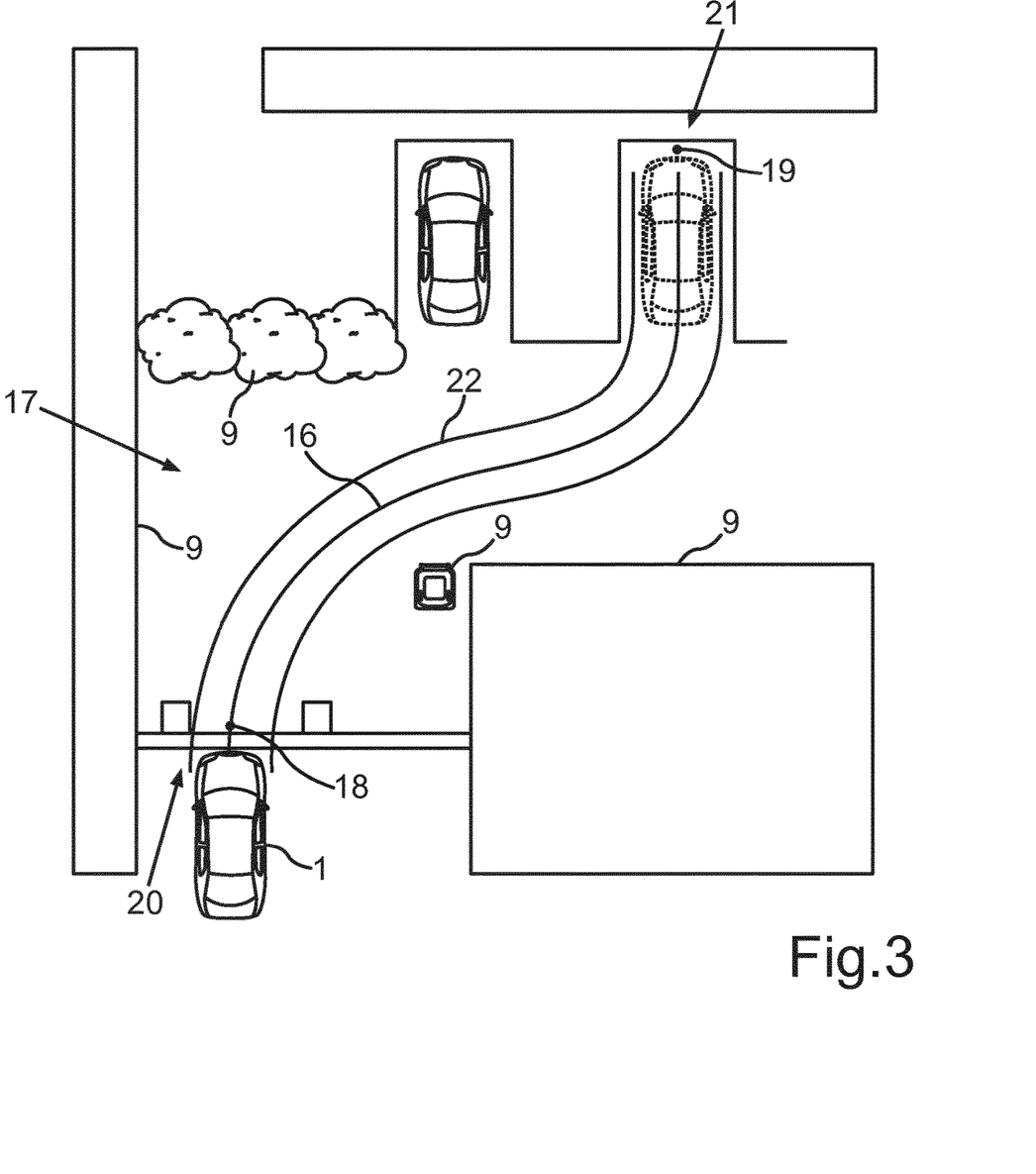
FIG. 3 shows the motor vehicle which is manoeuvred autonomously along a trajectory to a parking space using the driving assistance system.

The driving assistance system 2 can be used in particular to manoeuvre the motor vehicle 1 along a previously recorded trajectory 16. In this respect, FIG. 3 shows a home zone 17 which is assigned, for example, to a piece of land of the user 10. Within this home zone 17, the motor vehicle 1 can initially be manually manoeuvred by the user 10 during a training phase. In this context, the motor vehicle 1 is manoeuvred from a starting point 18 to a target point 19 along the trajectory 16. The starting point 18 is assigned here to an entry to the piece of land or the home zone 17, and the target point 19 is assigned to a parking space 21 or a garage. The trajectory 16 is recorded during the manual manoeuvring of the motor vehicle 1 by the user 10. In addition, objects 9 within the home zone 17 can be sensed and recorded.

In a subsequent operating phase of the driving assistance system 2, the motor vehicle 1 is manoeuvred autonomously along the recorded trajectory 16 using the driving assistance system 2. In the process, the position of the motor vehicle 1 is continuously determined by means of a odometry. In addition, the sensed objects 9 can be used as landmarks. In addition there is provision that the driving assistance system 2 is operated at the first automation level, and the user 10 is located outside the motor vehicle 1. In this context there may be provision that during the operation of the driving assistance system 2 switching back occurs from the first automation level to the second automation level. This can be the case, for example, if a predetermined hazardous situation is detected by means of the driving assistance system 2. Such a hazardous situation can be present, for example, if an object 9 is detected in a driving tube 22 by means of the driving assistance system 2. The driving tube 22 describes the area which the vehicle 1 takes up during the manoeuvring along the trajectory 16. The hazardous situation can also be assumed to be present if a dynamic object is detected in the surrounding area 5 or the home zone 17. In addition, the hazardous situation can be assumed to be present if one of the sensors 4 fails or it is currently not possible to localise the motor vehicle. If this is the situation that is detected, the motor vehicle 1 is firstly placed in the safe state, and a corresponding request signal is transmitted to the mobile terminal 11 of the user 10. This request signal can describe the detected hazardous situation. Subsequent to this, the user 10 assumes control again.

Figure 4:
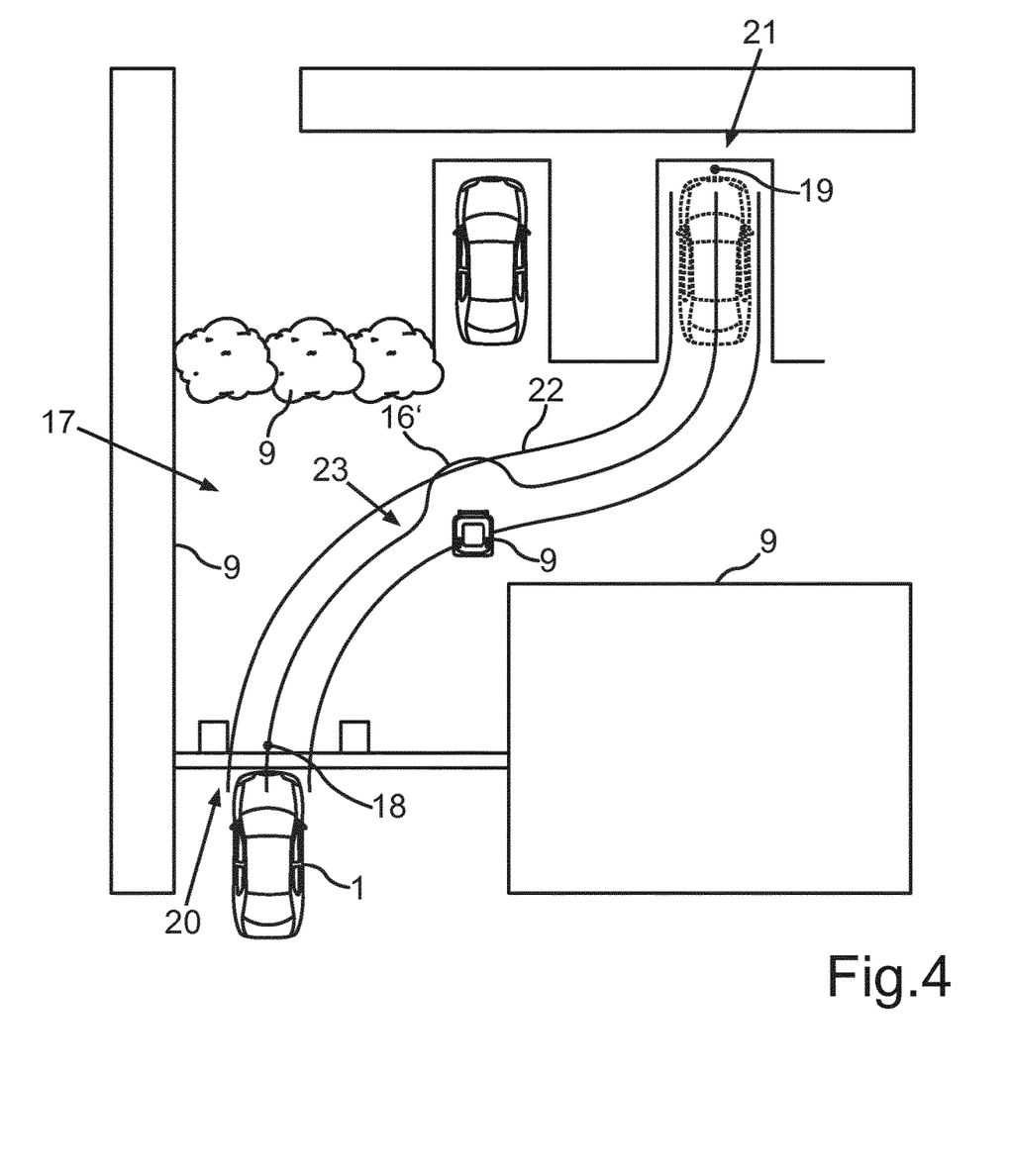
FIG. 4 shows the motor vehicle according to FIG. 3, wherein an avoidance trajectory is planned with the driving assistance system.

FIG. 4 shows the driving situation according to FIG. 3, wherein an object 9 in the form of a dustbin is located within the driving tube 22. At the first automation level, this object 9 is detected by means of the driving assistance system 2, and an avoidance trajectory 16' is determined in order to be able to avoid the object 9. It is checked here whether the avoidance trajectory 16' is located within a driveable area 23. The driveable area 23 is assigned to the driving tube 22 here. The driveable area 23 describes a predetermined area into which the motor vehicle 1 can be manoeuvred by means of the driving assistance system 2. If the avoidance trajectory 16' is located at least partially outside the driveable area 23, a corresponding signal is transmitted to the mobile terminal 11 in order to indicate to the user 10 that the driving assistance system 2 has planned this avoidance trajectory 16' outside the driveable area 13. In addition, there may be provision that this avoidance trajectory 16' is displayed to the user 10. The user 10 can subsequently check the avoidance trajectory 16', and if the motor vehicle 1 can be manoeuvred along the avoidance trajectory 16', the user 10 can make a corresponding operator control input on the mobile terminal 11. After this, the motor vehicle 1 can be manoeuvred along the avoidance trajectory 16', and subsequently along the recorded trajectory 16 again, by means of the driving assistance system 2.

The invention claimed is:

1. A method for operating a driving assistance system of a motor vehicle, comprising:
   manoeuvring the motor vehicle autonomously by the driving assistance system while a user with a mobile terminal is located outside the motor vehicle,
   carrying out, by the driving assistance system and during the manoeuvring, longitudinal guidance and transverse guidance of the motor vehicle;
   during the manoeuvring, operating the driving assistance system at a first automation level when communication between the driving assistance system and the mobile terminal is ensured,
   transmitting a message signal to the mobile terminal instructing the user to move back when the communication between the driving assistance system and the mobile terminal is no longer ensured;
   switching, in response to detecting a predetermined hazardous situation, from the first automation level to a second automation level;
   carrying out the guidance, at the second automation level, while the user activates the mobile terminal, the longitudinal guidance, and the transverse guidance, in a predetermined fashion;
   sensing, at the first automation level, by the driving assistance system, and in addition to the longitudinal guidance and the transverse guidance of the motor vehicle, a surrounding area of the motor vehicles and manoeuvring the motor vehicle autonomously in accordance with the sensed surrounding area.

2. The method according to claim 1, wherein at the first automation level a request signal is transmitted by the driving assistance system to the mobile terminal when intervention by the user into an autonomous driving manoeuvre is required.

3. The method according to claim 2, wherein when the predetermined hazardous situation is detected, the request signal is transmitted by the driving assistance system to the mobile terminal, and information about the hazardous situation is output by the mobile terminal after receiving the request signal.

4. The method according to claim 3, wherein the driving assistance system is placed in a safe state in which the motor vehicle is braked to a standstill, in accordance with the detected hazardous situation before operation at the second automation level.

5. The method according to claim 3, wherein after detecting the hazardous situation the driving assistance system is operated again at the first automation level when the user makes a predetermined operator control input.

6. The method according to claim 3, wherein an object in the surrounding area of the motor vehicle, a failure of a sensor for monitoring the surrounding area and/or a predetermined deviation during a localisation of the motor vehicle is detected as the predetermined hazardous situation.

7. The method according to claim 1, wherein when an avoidance trajectory outside a predetermined driveable area is planned by the driving assistance system, the avoidance trajectory is displayed to the user.

8. The method according to claim 7, wherein after an operator control input has been carried out by the user on the mobile terminal, the motor vehicle is manoeuvred along the planned avoidance trajectory by the driving assistance system.

9. The method according to claim 1, wherein at the first automation level the motor vehicle is manoeuvred along a previously recorded trajectory.

10. The method according to claim 1, further comprising: to determine whether the communication between the driving assistance system and the mobile terminal is ensured, checking whether the mobile terminal is in a communication area and/or whether a communication link has been established between the driving assistance system and the mobile terminal.

11. The method according to claim 10, further comprising: determining an autonomy area in which the motor vehicle is manoeuvred at the first automation level, wherein the autonomy area lies within the communication area.

12. The method according to claim 11, further comprising: determining an intermediate area between the autonomy area and the communication area; and transmitting the message signal to the mobile terminal when the user is located in the intermediate area, wherein the message signal instructs the user to move back into the autonomy area.

13. The method according to claim 1, wherein the driving assistance system is placed in a safe state in which the motor vehicle is braked to a standstill when the communication between the driving assistance system and the mobile terminal is not ensured.

14. A driving assistance system for a motor vehicle, which is configured to perform a method according to claim 1.

* * * * *